Aug. 10, 1937.  S. E. RICHESON  2,089,663
COFFEE ROASTING MACHINE
Filed Aug. 1, 1936  4 Sheets-Sheet 1

SANFORD E. RICHESON
INVENTOR
BY John P. Nikonow
ATTORNEY

Aug. 10, 1937.  S. E. RICHESON  2,089,663
COFFEE ROASTING MACHINE
Filed Aug. 1, 1936   4 Sheets-Sheet 3

SANFORD E. RICHESON
INVENTOR
BY John P. Nikonow
ATTORNEY

Aug. 10, 1937.　　　　S. E. RICHESON　　　　2,089,663
COFFEE ROASTING MACHINE
Filed Aug. 1, 1936　　　　4 Sheets-Sheet 4
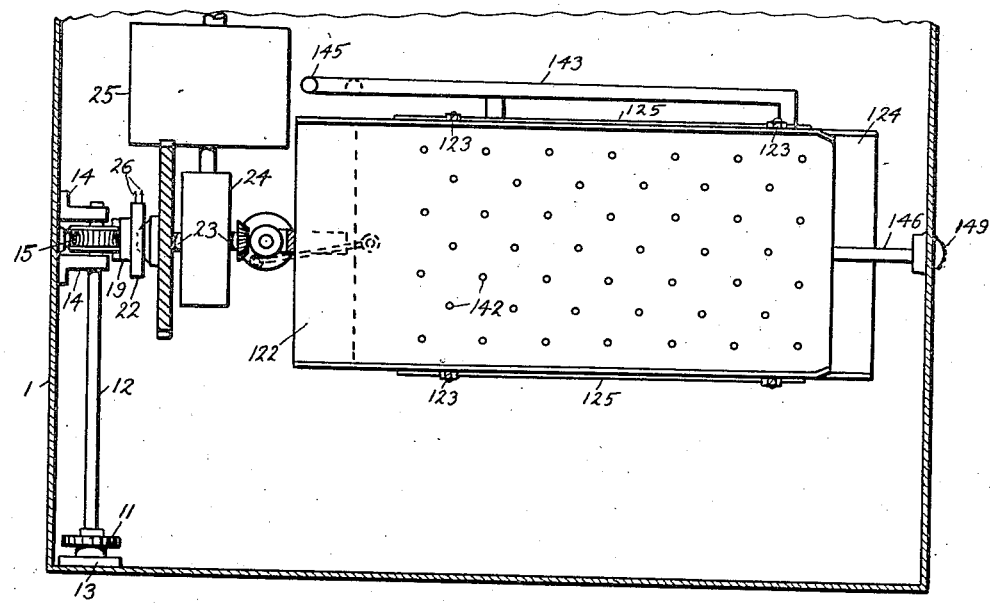
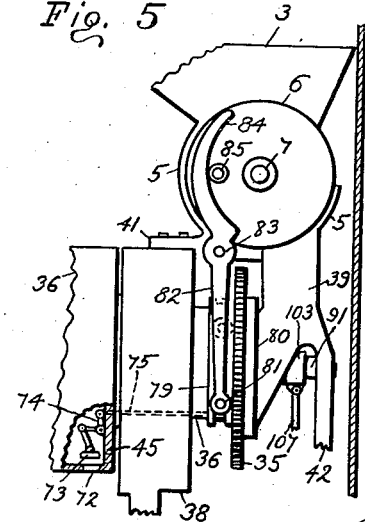
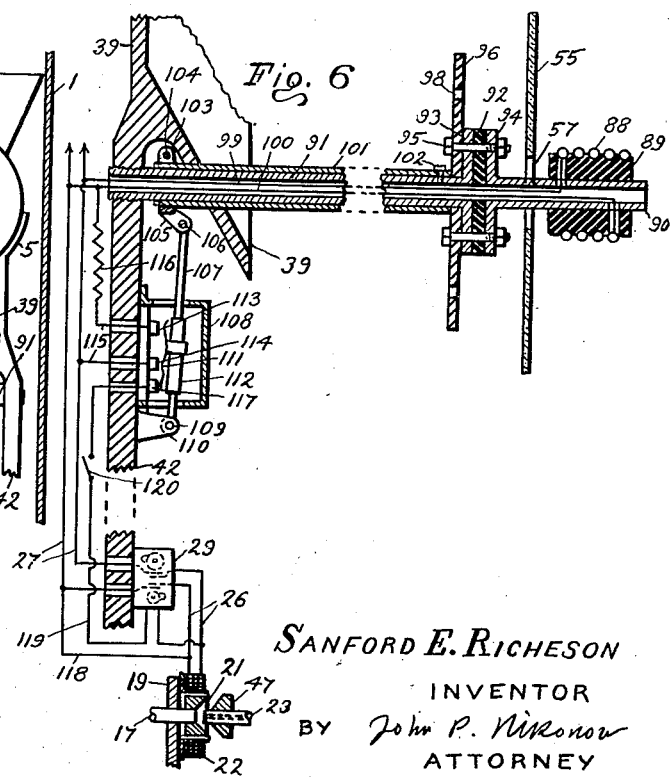
Sanford E. Richeson
INVENTOR
BY John P. Nixonov
ATTORNEY Patented Aug. 10, 1937

2,089,663

UNITED STATES PATENT OFFICE 2,089,663

COFFEE ROASTING MACHINE

Sanford E. Richeson, New York, N. Y., assignor to Richeson Company, Inc., New York, N. Y., a corporation of New York Application August 1, 1936, Serial No. 93,844

11 Claims. (Cl. 34—5)

My invention relates to coffee roasting machines and has particular reference to machines for roasting coffee beans by a continuous process.

The object of my invention is to provide a machine with a revolving roasting cylinder, into which a measured quantity of coffee beans is admitted at predetermined intervals of time, means being provided for moving the beans along the cylinder while they are being subjected to a roasting heat, and then periodically discharging roasted beans by definite portions, thereby maintaining an automatic and continuous passage of the beans through the cylinder.

Another object of my invention is to provide means for electrically heating the air for roasting the coffee beans, the electric heater being provided with an automatic temperature control adapted to maintain the desired average temperature throughout the roasting chamber.

Another object of my invention is to provide means for automatically separating the roasted beans from the chaff, for which purpose the discharged beans from the roasting chamber are passed over a series of shaking screens.

Another object of my invention is to provide means for preheating the air before it is passed through the electric heater. For this purpose the fresh air is first passed through hollow bottoms of the shaking screens, where the air is heated by the hot beans, the latter being cooled thereby. A means is also provided for circulating the preheated air from the shaker bottoms through a heat exchanger for further heating the air by the exhaust fumes and smoky air from the roasting chamber; the partly preheated air being then finally preheated by passing it through a jacket around the roasting cylinder; and the finally preheated air is then admitted to the heating element at the end of the cylinder.

An arrangement is also provided for exhausting the used hot air with smoke from the roasting chamber and using it in the heat exchanger for preheating the fresh air.

Still another object of my invention is to provide means for washing and purifying the exhaust smoky air from the roasting chamber, after its heat has been used for preheating the fresh air, for either discharging into the atmosphere or using it again in the machine.

My invention is more fully described in the accompanying specification and drawings in which—

Fig. 4 is a sectional view taken on the line 4—4 of Fig. 1;

Fig. 5 is a fractional sectional view taken on the line 5—5 of Fig. 2;

Fig. 6 is a detail view of the electric heater and temperature control device.

Figure 1:
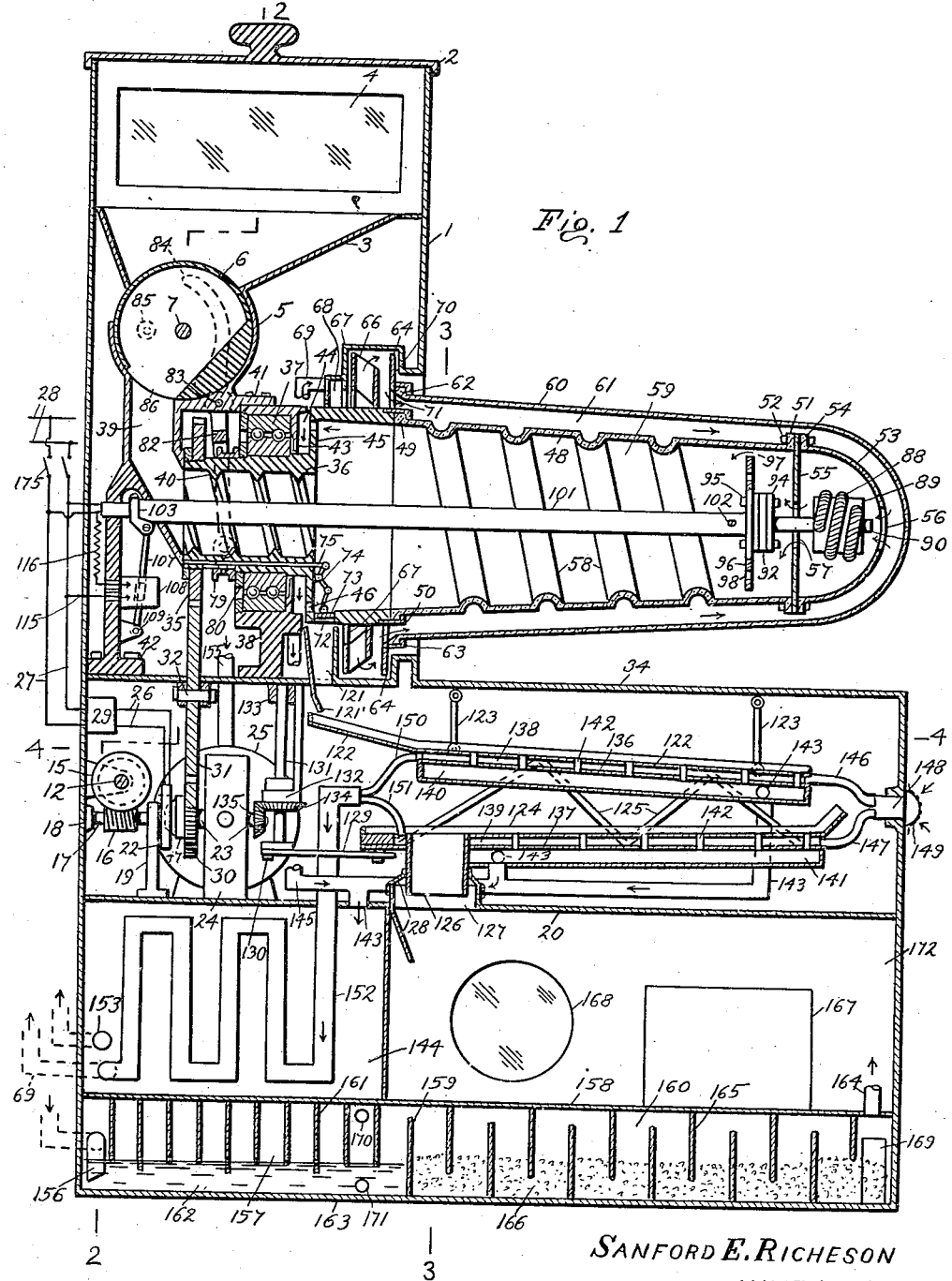
Fig. 1 is a sectional elevation of my machine.
Figure 2:
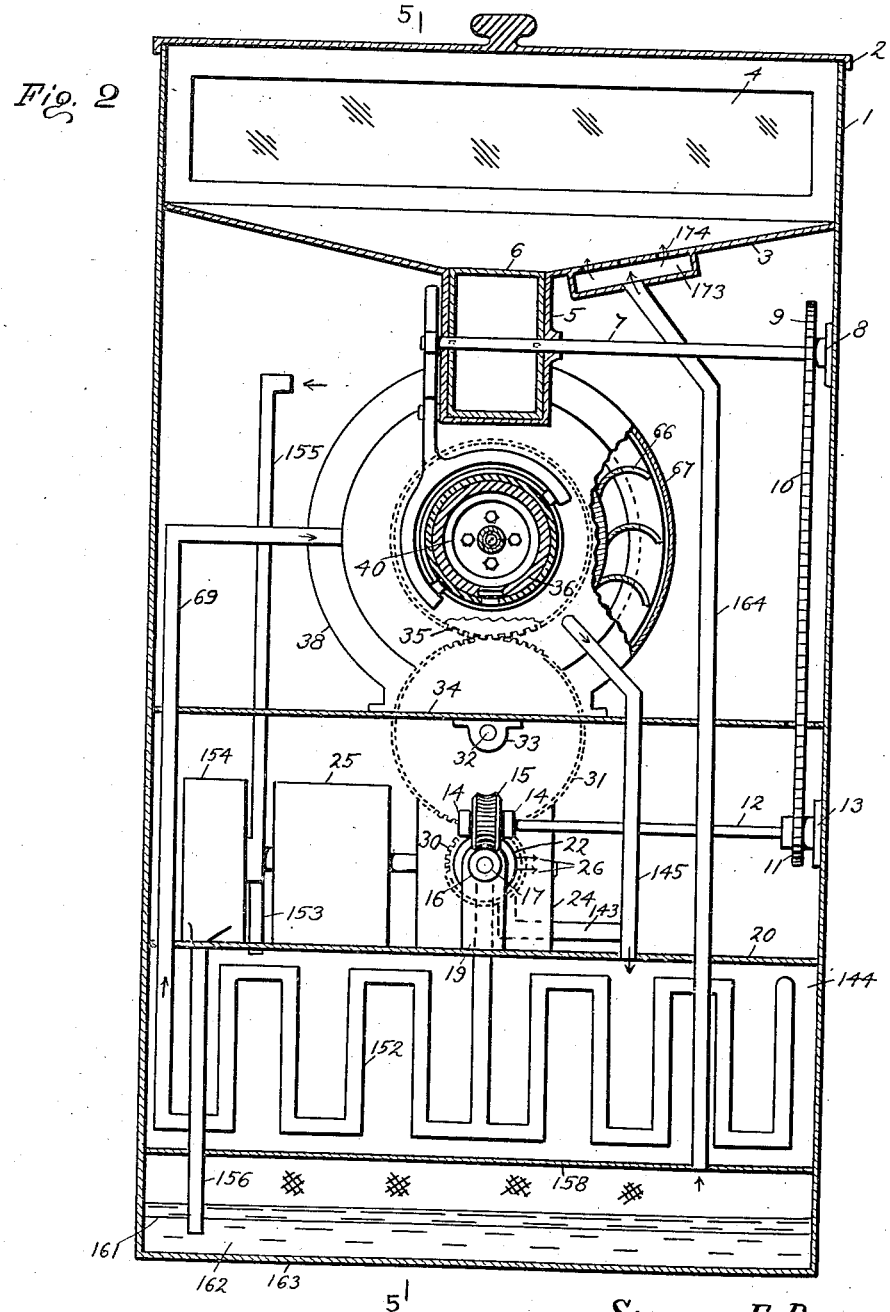
Fig. 2 is a sectional view taken on the line 2—2 of Fig. 1.
Figure 3:
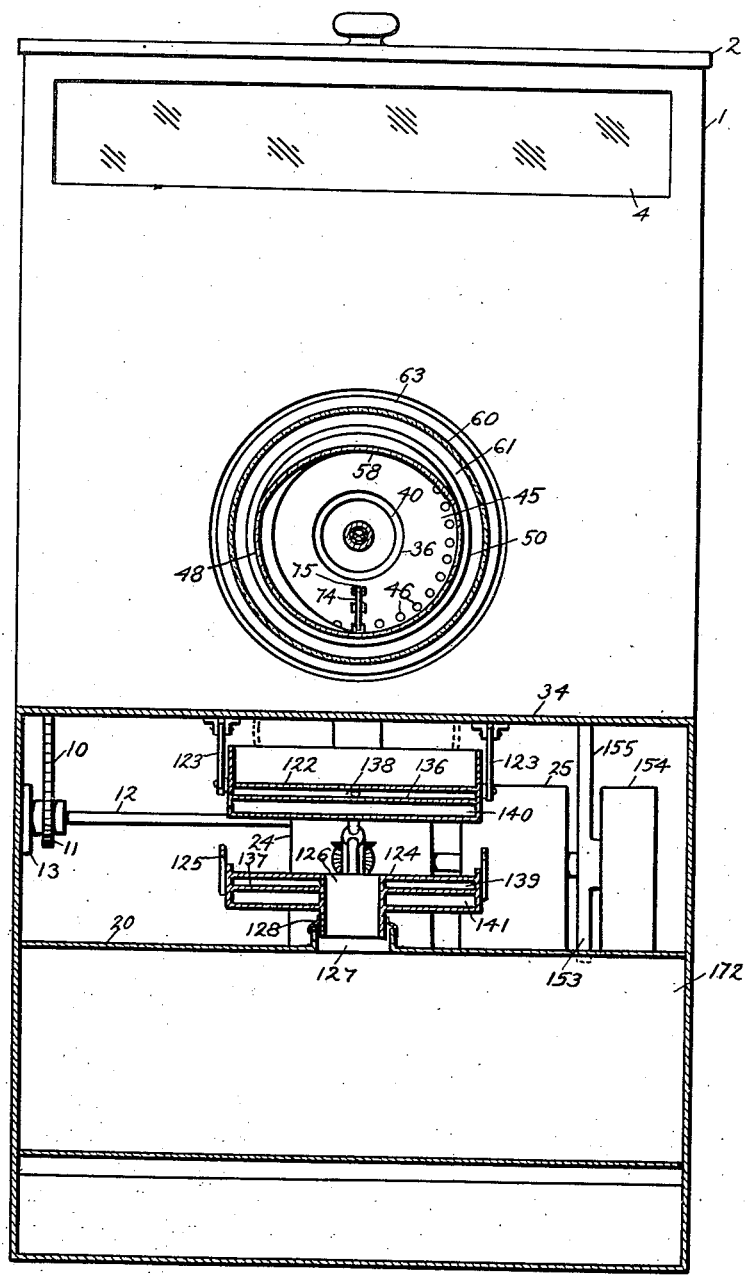
Fig. 3 is a sectional view taken on the line 3—3 of Fig. 1.

My coffee roasting machine consists of a housing 1 open on top and provided with a cover 2. A hopper 3 is supported in the upper portion of the housing for loading raw beans into the machine. Glass windows 4 are provided in the housing above the hopper for observing the beans in the hopper. The latter has a horizontal cylindrical housing 5 in its lower portion for an automatic feeder. The latter consists of a hollow cylinder 6 mounted on a shaft 7 journaled in the sides of the housing 5. The shaft extends to the wall of the housing 1 where it is supported in a bearing 8 and has a sprocket wheel 9 connected by a chain 10 with a driving sprocket 11 on a shaft 12 journaled in a bearing 13 at one end. The other end of the shaft 12 is journaled in brackets 14 and has a worm gear 15 in mesh with a worm 16 on a short shaft 17 journaled in a bearing 18 and bracket 19, the latter being supported on a floor plate 20. The end of the shaft 17 outside of the bracket 19 carries a female part 21 of a magnetic cone clutch enclosed by a stationary magnet coil 22. The male portion 47 of the clutch is slidably fitted on the end of a shaft 23 of a reduction gear box 24 operated by an electric motor 25. The cone 47 is keyed on the shaft 23. The latter has a pinion 30 in mesh with an idler gear 31 rotating on a shaft 32 supported in brackets 33 suspended from an upper deck or floor plate 34. The gear 31 is in mesh with a ring gear 35 mounted on the rear end of a tubular casing 36 rotatively supported in a ball bearing 37 mounted in a bracket 38 supported on the plate 34. The rear end of the casing abuts the lower end of a spout 39 extending from the feeder housing 5 and is provided with a spiral rib 40, the direction of the spiral being such as to cause the material delivered by the feeder into the casing to be moved forward by the rotation of the casing 36. The spout with the feeder housing is supported on a standard 42 resting on the plate 34. A lug 41 extends from the feeder housing and is attached to the bracket 38. The coil 22 is connected by leads 26 with a clock mechanism 29, the latter being in turn connected by leads 27 with a source of electric power 28. The clock is adjusted so that it closes the current for the coil 22 at predetermined intervals of time, the current being closed for the length of time sufficient to permit the feeder cylinder 6 to make one complete revolution, ending with its position shown in Fig. 1 for discharging the material into the spout 39.

The bearing 37 is closed at the front side by a wall 43 forming an annular chamber 44 with a wall 45 of the casing 36, this wall 45 connecting the rear portion of the casing with its enlarged front portion. The wall 45 has holes 46 extending into the chamber 44. A tapering cylinder 48 is attached by its rear end to the front end of the casing 36, a flange 49 on the cylinder being held by a ring-shaped clamp 50. The front end of the cylinder has a flange 51 with holes for bolts 52 which fasten a rounded cap 53 to the cylinder, the cap having a corresponding flange 54 with holes for the bolts 52. A baffle plate 55 is clamped between the cylinder and cap. The cap has an opening 56 in the front portion, and the plate 55 has an opening 57 in the central part. The cylinder 48 has a spiral rib 58 inside arranged in the same direction as the rib 40 in the casing. The rib 58 is formed by depressing the material of the cylinder on the outside so as to maintain the uniform thickness of its walls. The cylinder, the cap 53 and the baffle plate 55 are made of a transparent heat resisting material, preferably quartz or glass of a high silica content. The space inside of the cylinder represents a roasting chamber 59.

The cylinder 48 is enclosed outside by an outer cylinder 60 also made of a transparent material, but not necessarily of a highly refractory type, and ordinary glass may be used, as this cylinder is not subjected to a very high temperature. It forms an annular chamber 61 with the inner cylinder 48. It has a flange 62 at the rear end, held by a ring-shaped clamp 63 against a radial wall 64 on the casing 36. The wall 64 has apertures 65 opening into the space 61.

The enlarged portion of the casing 36 has a blower 66 enclosed by a housing 67 supported on the inside of the housing 1 of the machine. The blower has an intake opening 67 in communication with an air chamber 68 to which air is conducted by a pipe 69. A shield 70 extends from the casing 36 forming support for the clamp 62 and directing air from the blower through openings 71 into the space 61.

A discharge port 72 is provided at the rear end of the roasting chamber 59 and is closed by a cover 73. The latter is connected with a bell crank 74 the other end of which is connected with a rod 75 slidably fitted in the trunnion portion of the casing 36. The rod 75 is connected by a bolt 76 passing through a slot 77 with a sliding collar 79 which can be moved between the gear 35 and a bearing retaining nut 80. The collar 79 is engaged by pins 81 on the ends of a fork 82 pivotally supported at 83 on the housing 5. The other end of the fork has a cam 84 which is engaged by an eccentric pin 85 with a roller secured on the end portion of the feeder cylinder 6. The pin 85 is located so that it engages the cam 84 when the feeder cylinder is turned upwardly with its port 86 for receiving the fresh charge of a material from the hopper 3, at which time the fork operates the crank lever and opens the door or cover 73.

Heat for the roasting chamber is provided by an electric heater 87, which may represent a spirally wound coil 88 of a heat resistant wire, such as nichrome, on a cylinder 89 made of an insulating and heat resistant material, such as an asbestos composition, porcelain, etc. The cylinder is mounted on the end of a tubular member 90 passing through the opening 57 in the plate 55.

The rod 90 forms an extension of a tubular rod 91 to which it is attached by an insulated coupling. The latter consists of a heat insulating disc 92 clamped between flanges 93 and 94 on the ends of the rods 90 and 91 by bolts 95. A metal disc 96 is held on the flange 93 by the bolts 95. This disc, which may be made of metal, is less than the inside diameter of the cylinder 48, leaving an annular clearance 97, sufficiently narrow to prevent the escape of the roasted material. It has also small holes 98 for air circulation.

The other end of the tubular rod 91 is screwed into the supporting member 42. The heater is connected by leads 99 and 100 with the supply circuit 28.

The heater is controlled by a thermostatic element consisting of a tube 101 slidably fitted on the rod 91 and fastened to it at one end by a screw 102. The other end of the tube passes through a corresponding hole in the wall of the spout 39 and has a collar 103 which is clamped on the tube by a bolt 104. The collar has a clevis 105 engaging a pin 106 on the end of an arm 107 of an electric switch 108. The pin is made smaller than the holes for it in the clevis to allow for a free movement of the arm. The latter is pivotally connected at 109 to a lug 110 and has a short-circuiting contact member 111 clamped on an insulation sleeve 112. The member 111 establishes a contact between points 113 and 114 connected by leads 115 with the leads 99 and 100 through a short-circuiting resistance 116. The tube 101 is made of a metal having high temperature coefficient, preferably of a copper alloy, while the rod 91 is made of a metal having low temperature coefficient, preferably a ferric alloy, for instance, invar. The tube, being held fast at the outer end, can freely expand, moving its other end along the central rod. It is possible, of course, to reverse the arrangement of thermostatic metals, making the tube of invar and the rod of brass. The switch then must be reversed for the same operation of the electric circuits.

An additional contact point 117 is provided in the switch for closing the circuit for the coil 22 directly by the thermostatic element, as shown in Fig. 6, through leads 118 and 119. This arrangement is required when the roasting operation is carried only until the desired temperature is reached. The lead 119 may be disconnected by a switch 120. This lead may be brought through the timing clock 29 if it is desired to limit the time when the coil 22 is energized.

The port 72 opens into a passage 121 with a chute inclined toward the rear extension of an upper shaking screen 122. The latter is inclined toward the front and is suspended on hinged links 123. A lower shaking screen 124 is suspended from the screen 122 on braces 125 and is inclined toward the rear where it has a discharge spout 126, extending into a discharge port 127. The port 127 is longer inside than the spout 126 so as to admit a certain degree of freedom for horizontal shaking movement. The clearance thereby formed is closed by a flexible tubing 128 made preferably of rubber or similar elastic material. The rear end of the lower screen is connected by a bar 129 with an eccentric pin 130 on a vertical shaft 131 journaled in bearings 132 and 133 mounted on the under side of the plate 34. The shaft 131 has a bevel gear 134 in mesh with a gear 135 on the extension of the transmission shaft 23. The bar 129 is pivoted at both ends and converts the rotary movement of the shaft 131 into longitudinal oscillations for the shaker screens. The screens are built as hollow flat boxes with intermediate partitions 136 and 137, forming chambers 138, 139, 140 and 141.

The lower chambers 140 and 141 are connected with the shaker plates on top by ducts 142 for the chaff and other foreign particles which may be present in the roasted material. These chambers are connected by pipes 143 with a preheating chamber 144, the pipes 143 being also connected with a pipe 145 extending from the annular chamber 44.

The upper chambers 138 and 139 are connected by flexible pipes 146 and 147 with an intake port 148 closed by a screen 149. Similar flexible pipes 150 and 151 connect the rear ends of the chambers 138 and 139 with a heating coil 152 placed in the preheating chamber 144, the chamber or compartment 144 together with the coil 152 forming a heat exchanger. The coil 152 is connected by a pipe 69 with the intake chamber 68 of the blower 66, and the chamber 144 is connected by a pipe 153 with the intake of a blower 154 directly connected with the motor 25. A pipe 155 extends from the intake of this blower to the space in the housing 1. The exhaust of the blower 154 is connected by a pipe 156 with an air washing chamber 157 in the base of the machine under a floor plate 158 and separated from a cleaning chamber 160 by a low wall 159. The washing chamber is partly filled with a suitable liquid, preferably water solution of chemicals which can dissolve or absorb impurities present in the air from the roasting chamber. Baffle plates or screens 161 are suspended from the plate 158 and are partly immersed in the solution 162. The cleaning chamber 160 contains staggered plates 165, partly suspended from the plate 158, partly mounted on the plate 163. A pipe 164 extends from the cleaning chamber 160 to a box 173 under the hopper 3, the box being connected with the space in the hopper by small holes 174.

In the spaces between the baffle plates 165 an absorbent material 166 is placed, such as an activated carbon. A door 167 is provided for the removal of the finished product, as may be observed through a window 168. A door 169 is used for the replacement of carbon 166, and plugs 170 and 171 are provided for the removal and replacement of the solution 162.

The operation of my machine is as follows.

The raw material, such as coffee beans, corn, small nuts, or similar products, is placed in the hopper 3. The motor 25 is started, and the current for the heater 88 is turned on by a switch 175. The time switch 29, being set for a certain length of time required for roasting the material, closes the circuit for the coil 22 after such time intervals, thereby engaging the clutch members 21 and 47. The worm 16 will accordingly rotate turning the gear 15 and shaft 12, which transmits the rotation through the chain 10 and sprocket 9 to the shaft 7 and the feeder drum 6. The latter, upon making one half revolution, will face the hopper 3 with its port 86 and will become filled by the material. With the further rotation of the feeder, it will be cut off from the feeder, the port 86 facing the wall 5 until, upon completion of the revolution, it returns to its original position shown in Fig. 1, with the port 86 opening into the spout 39, allowing the material to flow through the spout into casing 36. The material will continue to move forward, being propelled by the spiral rib 40, until it falls into the larger front portion of the casing. Here it will be moved further by the rib 58, the overflow falling back again, the whole volume or bulk of the material being thereby thoroughly stirred thereby obtaining a uniform heating throughout.

The time switch or clock 29 is set so that it keeps the circuit for the coil 22 closed for the length of time required for one revolution of the feeder drum 6, the feeder remaining stationary during the subsequent period when the material is being roasted. The drum 6, upon completion of about one half revolution and when in the receiving position, engages by the roller 85 the cam 84, thereby shifting the fork 82. The latter pulls on the rod 75 and turns the crank 74, opening the cover 73 and permitting the roasted material to drop through the chute 121 on the upper shaker screen, from which it flows on the lower screen 124 and, finally, drops through the discharge port 126 on the floor 158 in the delivering chamber 172. With the location of the roller 85 as shown, the charging of the roasting cylinder with the fresh material and the discharge of the roasted material do not occur simultaneously, the latter operation taking place before the new charge is admitted. This arrangement eliminates the possibility of any portion of the fresh material from being discharged with the roasted product.

The shakers 122 and 124 are continuously reciprocated by the eccentric pin 130 and link 129 from the shaft 131. The material is thereby energetically stirred and freed from chaff and dust, which fall through the ducts 142 into the lower collecting chambers 140 and 141. The removal of chaff is facilitated and expedited by the air suction created by the blower 154 and transmitted through the pipes 143, heating chamber 144, and pipe 153. The blower 154 also sucks the smoky air from the upper part of the housing 1, where it accumulates as a result of leakage from various joints, particularly between the spout and the rear end of the trunnion portion of the casing 36, the pipe 155 serving for the purpose of removing this smoky air.

The smoky exhaust air from the blower is delivered by the pipe 156 into the washing well 157 where it passes through the liquid 162 between screen baffles 161. The liquid, which may be pure water or water solution of suitable chemicals, removes a large portion of mechanically entrained dust and smoke particles, also certain soluble vapors. The air is finally purified by removing gases and the balance of vapors in the chamber 160 by the activated carbon 166 or similar absorbing (or adsorbing) agent. The purified air, which is still warm, is delivered by the pipe 164 to the raw material in the hopper 3 for its preheating.

Air for the heater is drawn by the blower blades 66 on the casing 36, which is continuously rotated by the motor 25 through the train of gears 30, 31 and 35. The air enters through the screen 149 and passes through the chambers 138 and 139, being heated by the hot material freshly delivered from the roasting chamber 59. The air is then further preheated in the coils 152 surrounded by the hot exhaust air from the pipe 143. It then passes through the pipe 69 to the receiving chamber 68 to be drawn by the blades 66, forcing it into the annular space 61 where it becomes still further preheated by the contact with the hot wall of the roasting cylinder 48. Finally it enters the space under the cap 53 through the opening 56 and becomes heated to the roasting temperature by the electric heater 88. It then passes into the roasting chamber through the opening 57 and the annular clearance 97. The hot air passes over the material in the roasting chamber and is exhausted through the holes 46 into the chamber 44, from which it is drawn into the chamber 144 through the pipe 145.

The temperature in the roasting chamber and, more particularly, of the material being roasted, is maintained substantially constant by the thermostatic control apparatus connected with the heater 88. The thermostatic tube 101, being constantly surrounded by the material in the chamber 59, acquires its temperature and correspondingly expands, moving the handle arm 107 of the switch, until at the predetermined roasting temperature the switch closes the contacts between the points 115 thereby short circuiting or shunting the resistance 88 on the resistor 116. As a result, the current through the heater will be reduced, with the correspondingly lowered heat output. When temperature drops below the roasting limit, the tube 101 contracts, pulling the arm 107 and opening the switch, thereby sending full current through the heater. The roasting operation thus continues until the timing switch 29 closes the circuit for the coil 22, causing the new charge to be delivered into the roasting cylinder, removing the roasted material.

In the arrangement shown in Fig. 6, the switch 108 has the third contact point 117 for closing the circuit for the coil 22 by the action of the thermostatic element 101. This operation may be used when it is desired to stop the roasting operation as soon as the material reaches the roasting temperature. The switch 120 is used for setting the machine in operation according to this plan. Additional parts of the clock mechanism 29 control the operation of the coil 22 when energized by the thermostatic switch, so as to limit the operation of the coil to the time required for one complete revolution of the feeder cylinder 6.

It will be noted that since the thermostatic tube 101 passes through the roasting chamber from one end to the other, it will be affected by the temperature of the material in different portions of the chamber, so that even if these temperatures may differ somewhat, the combined effect will be equivalent to the average or mean temperature of the material, although, of course, the material, because of its constant stirring and moving, will rapidly attain a fairly uniform temperature throughout. The tube 101 is affected only by the temperature of the material as the latter flows over the tube, the material either heating or cooling the tube according to its own temperature. The tube is not affected directly by the temperature of the heater, being insulated therefrom by the spacer 92 and air baffles 55 and 98.

It may be also noted that while the feeder and the discharge mechanism operate at the same time periods, they differ in phase, so that the discharge port is never open at the same time as the feeder delivers a fresh charge.

With my system of air circulation a very high efficiency of heat utilization is obtained, the fresh air being preheated by the exhaust air, while the latter is also washed and purified before its discharge into the atmosphere, thereby preventing the escape of any unpleasant odors, smoke, etc., and the purified air is finally used for preheating the raw material, thereby utilizing the remainder of its heat.

I claim as my invention:

1. A coffee roasting machine comprising a cylindrical container having a partly closed compartment at the end, means to rotatively support the container at the other end, means to rotate the container by its supported end, means to periodically charge the container with a raw material, means to discharge the product from the container, an electric heater in the compartment, an outer cylinder enclosing the container, means on the container for blowing air through the cylinder and through the compartment into the container thereby heating the material therein, and means to exhaust the used air from the container.

2. A coffee roasting machine comprising a cylindrical container, means to rotatively support the container, means to rotate the container, a hopper for a raw material, means to charge the container with the raw material from the hopper and to discharge the roasted product, an electric heater in the container, means on the container for delivering air into the container over the heater for heating the material therein, means to exhaust the used air from the container, means to preheat the fresh air for the container by the exhaust air, means to wash the exhaust air, means to filter and purify the washed exhaust air and means to deliver the purified air to the hopper for preheating the raw material.

3. A coffee roasting machine comprising a cylindrical container, means to rotatively support the container, means to rotate the container, means to charge the container with a raw material and to discharge the roasted product, an electric heater in the container, means to deliver air into the container over the heater thereby heating the material therein, shaker screens adapted to receive the product from the container and having double compartments underneath, means to circulate air for the container through the upper compartments thereby preheating the air by the product, the lower compartments being connected with the screens by ducts adapted to receive the chaff from the product, means to exhaust the air with the chaff from the lower compartments, means to use the air with the chaff for the further preheating of the air from the first compartment, means to exhaust the used air from the container and to use it together with the air from the lower screen compartments for preheating the fresh air for the container, and means to wash and purify the exhaust air.

4. A coffee roasting machine comprising a container, a hopper for a raw material, means to charge the container with a raw material from the hopper and to discharge the product therefrom, means to deliver air into the container, means to heat the air to the predetermined temperature, means to exhaust the used air from the container, shaker screens for the product, means to oscillate the screens, means to preheat the air for the container by the material on the screens, a heat exchanger adapted further to preheat the air for the container by the exhaust air, means to wash the exhaust air, means to purify the washed air, and means to deliver the purified air to the raw material in the hopper for preheating the same.

5. A coffee roasting machine comprising a container, a hopper for a raw material, means to charge the container with a raw material from the hopper and to discharge the product therefrom, means to deliver air into the container, means to heat the air in the container to a predetermined temperature, means to exhaust the used air from the container, means to remove the chaff from the product by the blast of air, means to use the air with the chaff and the exhaust air for preheating the air for the container, a well adapted to contain a liquid for washing the exhaust air and the chaff, a plurality of baffle plates partly immersed in the liquid, a substantially flat container adapted to hold an air purifying substance, a plurality of staggered baffle plates in the flat container, the exhaust air being adapted to circulate through the well and the flat container, and means to deliver the purified air to the raw material in the hopper for preheating the same.

6. A coffee roasting machine comprising a tubular container rotatively supported at one end, means to rotate the container by its supported end, the free end of the container having a relatively small aperture, an outer cylinder fully enclosing the free portion of the container, and spaced therefrom thereby forming an annular chamber, a rod extending through the container to its apertured end, an electric heater on the end of the rod near the aperture, means to deliver a raw material into the container, means to remove the roasted product therefrom, means to protect the heater from the material, and means to blow air through the annular chamber toward the apertured end of the container and back through the container, the heater being adapted to heat the air for the container to the roasting temperature.

7. A coffee roasting machine comprising a tubular container, means to rotatively support the container at one end, means to rotate the container, a housing enclosing the supported end of the container, means to deliver a raw material into the container, an outer cylinder extending around the container and spaced therefrom thereby forming an annular chamber around the container, the cylinder being closed around the free end of the container, the container having a relatively small aperture in its free end, an enclosure in the housing around the supported end of the cylinder, means to blow air through the enclosure into the annular chamber and therefrom through the aperture and through the container, means to heat the air for roasting the material, means to remove the roasted product from the container, means to admit the exhaust air from the container into the housing, means to remove and to purify the air from the housing, and means to deliver the purified air to the blowing means.

8. A coffee roasting machine comprising a tubular container, means to rotatively support the container, means to rotate the container, a hopper for a raw material, a feeder for the raw material movably supported between the hopper and the container, an operative connection between the feeder and the container rotating means, a magnet controlling the operative connections, means to roast the material in the container, means to discharge the roasted product from the container, means to control the discharging means by the feeder, and means to render the feeder operative at predetermined periods of time.

9. A coffee roasting machine comprising a tubular container, means to rotatively support the container, means to rotate the container, a hopper for a raw material, a feeder movably supported between the hopper and the container, means to operate the feeder, a clock mechanism adapted to render the feeder operating means operative at predetermined periods of time, means to limit the movement of the feeder to one cycle of operations, electrical means to roast the material in the container, a thermostatic means to control the roasting means, and means operated by the feeder for discharging the roasted material from the container.

10. A coffee roasting machine comprising a tubular container, means to rotatively support the container, means to rotate the container, a hopper for a raw material, a feeder rotatively supported between the hopper and the container, means to rotate the feeder, a clock mechanism adapted to render the feeder rotating means operative at predetermined periods of time, means to roast the material in the container, feeder operated means for discharging the roasted product from the container, and means to control the roasting temperature, the clock mechanism being adapted to limit the rotation of the feeder each time to one cycle of container charging and discharging operations.

11. A coffee roasting machine comprising a tubular container, means to rotatively support the container, means to rotate the container, means to deliver a raw material into the container, means to roast the material in the container, means to discharge the roasted material, a plurality of inclined shakers adapted to receive the roasted material from the container, means to reciprocate the shakers thereby causing the material to move over the shakers, the shakers being provided with a plurality of small apertures for extracting chaff from the material, enclosures for the shakers, means to admit fresh air into the enclosure, means to exhaust the air, heated by the material, from the enclosures, means to deliver the heated air to the container, and flexible connections for the air between the shakers and stationary portions of the air admitting and exhausting means.

SANFORD E. RICHESON.